Patented July 5, 1949

2,475,520

UNITED STATES PATENT OFFICE 2,475,520

ETHYLENE POLYMERIZATION WITH GRIGNARD TYPE COMPOUNDS

Milton J. Roedel, Talleyville, Del., assignor to E. I. du Pont de Nemours & Company, Wilmington, Del., a corporation of Delaware No Drawing. Application May 22, 1944, Serial No. 536,823

3 Claims. (Cl. 260—94.9)

This invention relates to improvements in the catalytic polymerization of ethylene.

It is known that ethylene can be polymerized with the aid of catalysts such as oxygen, dialkyl dioxides, acyl peroxides, chloramine T, manganese dioxide, amine oxides, tetraphenyltin, tetraethyllead, butyllithium, hexachloroethane, sodium perborate, sodium persulfate, potassium chlorate plus manganese dioxide, and hydrazine salts. However, none of these compounds catalyzes the formation of ethylene polymers which possess tensile strengths much in excess of 3,000 pounds per square inch.

It is the object of this invention to provide an efficient means of polymerizing ethylene to a high molecular weight polymer possessing a very high tensile strength. Further objects and advantages will appear hereinafter.

Orientable polymers of ethylene possessing very high tensile strengths are prepared by the polymerization of ethylene in an anhydrous, inert solvent medium using as a catalyst a mixture comprising metals and halogen compounds, capable of yielding an organo-metallic complex of the general formula RMX, in which R is an alkyl, aryl or aralkyl group, M is zinc or magnesium and X a halogen at temperatures of 100° C. to 250° C. and ethylene pressures of 400 to 1500 atmospheres and above. Furthermore, liquid to solid polymers of and from ethylene may also be obtained through the use of these catalysts at temperatures between 100 and 400° C. and pressures from 50 to 3000 atmospheres or higher.

The polymerization of ethylene employing the aforesaid mixture of metals and halogen compounds as catalysts in an anhydrous, inert, polymerization medium can be carried out either as a batch, semi-continuous, or continuous operation in which a suitable reaction vessel is charged with the catalyst and the anhydrous, inert medium, and treated under superatmospheric ethylene pressure until the desired degree of polymerization has been attained. Generally, the polymerization is conducted in vessels which are either constructed of or lined with stainless steel, silver, mild steel, etc.

The examples which follow are intended to illustrate and not to limit this invention. Unless otherwise stated, parts are by weight.

*Example 1.*—A stainless steel pressure reactor is flushed with dry, oxygen-free nitrogen and charged with 88 parts of anhydrous, thiophene-free benzene, 0.725 parts of ethyl bromide, and 1 part of magnesium turnings. This charge occupies about 25% of the volume of the reactor. After removal of the nitrogen by evacuation, the reactor is charged with ethylene to a pressure of 300 atmospheres and heated to 150° C. Upon reaching this temperature, the ethylene pressure is raised to 1000 atmospheres and the polymerization is allowed to proceed with agitation for ten hours, after which no more ethylene is absorbed. As the ethylene polymerizes, the system is kept between 900–1000 atmospheres pressure by the addition of more ethylene. The total pressure drop is about 380 atmospheres. The reactor is cooled and the excess ethylene bled off. There is obtained a white, fibrous ethylene polymer possessing an apparent density of 0.2257 in the massive state and an intrinsic viscosity of 1.52 (measured as a 0.125% solution in xylene at 85° C.), which corresponds to a molecular weight of about 28,000. This ethylene polymer possesses the very high tensile strength of 4710 pounds per square inch at 530% elongation. Since the polymer is obtained in a massive state which is resilient, non-wettable by water, and of low apparent density, it is also of value for application in life preservers, mattress and pillow fillers, heat and sound insulation, and like uses which require low density products.

*Example 2.*—A stainless steel pressure reactor is flushed with dry, oxygen-free nitrogen and charged with 88 parts of anhydrous, thiophene-free benzene, 1.5 parts of bromobenzene, and 1 part magnesium turnings. This charge occupies about 25% of the volume of the reactor. After removal of the nitrogen by evacuation, the reactor is charged with ethylene to a pressure of 200 atmospheres and is heated to 175° C. Upon reaching this temperature, the ethylene pressure is raised to 975 atmospheres and the polymerization is allowed to proceed with agitation for a thirteen-hour period. As the ethylene polymerizes, the system is kept between 875 and 975 atmospheres pressure by repressuring with ethylene. The total pressure drop is about 200 atmospheres. The reactor is cooled and the excess ethylene bled off. There is obtained a white, solid ethylene polymer possessing an intrinsic viscosity of 1.39 (measured as a 0.125% solution in xylene at 85° C.) which corresponds to a molecular weight of about 25,000.

*Example 3.*—A stainless steel pressure reactor is flushed with dry, oxygen-free nitrogen and is charged with 88 parts of anhydrous, thiophene-free benzene, 1.5 parts of ethyl bromide, and 5 parts of mossy zinc. This charge occupies about 25% of the volume of the reactor. After removal of the nitrogen by evacuation, the reactor is charged with ethylene to a pressure of 200 atmospheres and heated to 175° C. Upon reaching this temperature, the ethylene pressure is raised to 1000 atmospheres and the polymerization is allowed to proceed for thirteen hours with agitation. As the ethylene polymerizes, the system is kept between 850 and 1000 atmospheres pressure by the addition of more ethylene. The reactor is cooled and the excess ethylene bled off. From the reaction mixture, there is obtained 40 parts of a porous ethylene polymer possessing an intrinsic viscosity of 1.52 (measured as a 0.125% solution in xylene at 85° C.) which corresponds to a molecular weight of about 28,000.

Metals which have been found useful in combination with organic halides as catalysts for ethylene polymerization include magnesium and zinc.

Organic halides which are useful in the practice of this invention include: alkyl halides such as methyl chloride, ethyl bromide, and tertiary butyl iodide; cycloalkyl halides such as cyclopentyl chloride and cyclohexyl bromide; aryl halides such as phenyl chloride and bromide, toluyl bromide, xylyl iodide, and naphthyl chloride; aryl alkyl halides such as benzyl chloride; and, heterocyclic halides such as alpha-furyl bromide.

As a rule, the amount of catalyst will vary from about 0.005% to about 5% of the total weight of materials charged into the reaction vessel of which at least 0.002% is magnesium or zinc and at least 0.003% is alkyl halide.

The polymerization is carried out in an inert, anhydrous system. Suitable media, for operation in this manner, include isooctane, diethyl ether, benzene, and the like.

It is preferable to use as pure ethylene as is commercially available. In general, the process is operated under conditions such that the molecular oxygen content of the system based on ethylene is less than 200 parts per million with under 10 parts per million giving outstanding products.

Ethylene copolymers can likewise be obtained in anhydrous, inert systems in the presence of reactants capable of yielding Grignard compounds as catalysts by introducing the other polymerizable compounds, such olefins as propylene, isobutylene, and styrene; such vinyl ethers as methyl vinyl ether, and tertiary butyl vinyl ether; and such vinyl halides as vinyl fluoride, tetrafluoroethylene, and vinyl chloride into the reactor before or during the polymerization process.

Because of their unusually high degree of toughness, the orientable ethylene polymers obtained by this invention are especially well suited for such applications as wrapping films and foils, oriented monofils, and fibers, extruded rigid and collapsible tubing, protective coatings, and other uses.

I claim:

1. In a process for the preparation of orientable polymers of ethylene, the step which comprises polymerizing ethylene at a temperature between 100 and 400° C. and a pressure between 400 and 1500 atmospheres in the presence of anhydrous benzene and from 0.005 to 5%, of the total weight of materials, of a catalyst consisting of ethyl bromide and metallic magnesium, the magnesium being present to the extent of at least 0.002% and the ethyl bromide to the extent of at least 0.003%.

2. A process for the preparation of orientable polymers of ethylene which comprises polymerizing ethylene at a temperature between 100° and 250° C. and a pressure between 400 and 1500 atmospheres in a normally liquid, anhydrous, inert medium, the polymerization being conducted in the presence of from 0.005 to about 5% of a catalyst, based on the total weight of monomers present, at least 0.003% of which is an organic halide, and at least 0.002% of which is a metal selected from the group consisting of magnesium and zinc which organic halide and metal are capable of forming an organo-metallic complex of the general formula RMX in which R is of the group consisting of alkyl, aryl and aralkyl groups, M is of the group consisting of zinc and magnesium and X is a halogen.

3. In a process for the preparation of orientable polymers of ethylene, the step which comprises polymerizing ethylene at a temperature between 100° and 400° C. and a pressure between 400 and 1500 atmospheres in the presence of an anhydrous inert solvent medium and from 0.005 to 5% of a catalyst, based on the total weight of materials present, at least 0.003% of which is an alkyl halide and at least 0.002% of which is a metal selected from the group consisting of magnesium and zinc which alkyl halide and metal are capable of forming an organo-metallic complex of the general formula RMX in which R is of the group consisting of alkyl, aryl and aralkyl groups, M is of the group consisting of zinc and magnesium and X is a halogen.

MILTON J. ROEDEL.

REFERENCES CITED

The following references are of record in the file of this patent:

UNITED STATES PATENTS

| Number | Name | Date |
| --- | --- | --- |
| 2,188,465 | Perrin | Jan. 30, 1940 |
| 2,325,060 | Ingersoll | July 27, 1943 |
| 2,334,195 | Hopff | Nov. 16, 1943 |